(12) United States Patent
Kang et al.

(10) Patent No.: US 11,836,435 B1
(45) Date of Patent: Dec. 5, 2023

(54) MACHINE LEARNING BASED PARASITIC ESTIMATION FOR AN INTEGRATED CIRCUIT CHIP DESIGN

(71) Applicant: Synopsys, Inc., Mountain View, CA (US)

(72) Inventors: Seungil Kang, Mountain View, CA (US); Koohak Kim, Mountain View, CA (US); Prasanna Srinivas, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 183 days.

(21) Appl. No.: 17/395,355

(22) Filed: Aug. 5, 2021

Related U.S. Application Data

(60) Provisional application No. 63/063,101, filed on Aug. 7, 2020.

(51) Int. Cl.
*G06F 30/398* (2020.01)
*G06N 20/00* (2019.01)
*G06F 30/394* (2020.01)
G06F 119/02 (2020.01)

(52) U.S. Cl.
CPC .......... *G06F 30/398* (2020.01); *G06F 30/394* (2020.01); *G06N 20/00* (2019.01); *G06F 2119/02* (2020.01)

(58) Field of Classification Search
CPC .. G06F 30/398; G06F 30/394; G06F 2119/02; G06N 20/00
See application file for complete search history.

(56) References Cited

U.S. PATENT DOCUMENTS

| | | | | |
|---|---|---|---|---|
| 10,528,695 | B1* | 1/2020 | Lvov | G06F 17/15 |
| 11,348,000 | B1* | 5/2022 | Ding | G06F 30/00 |
| 2012/0226479 | A1* | 9/2012 | Su | G06F 30/398 |
| | | | | 703/1 |
| 2018/0307790 | A1* | 10/2018 | Chuang | G06N 3/08 |
| 2019/0121928 | A1* | 4/2019 | Wu | H01L 24/97 |
| 2019/0188354 | A1* | 6/2019 | Won | G06F 30/398 |
| 2021/0158127 | A1* | 5/2021 | Ren | G06F 16/9024 |
| 2021/0248299 | A1* | 8/2021 | Kourkoulos | G06F 30/398 |
| 2023/0095028 | A1* | 3/2023 | Ma | G06F 30/27 |
| | | | | 716/53 |

* cited by examiner

*Primary Examiner* — Nha T Nguyen
(74) *Attorney, Agent, or Firm* — Patterson + Sheridan, LLP

(57) ABSTRACT

Certain aspects are directed to apparatus and techniques for estimating parasitic information associated with routing of a design using a pre-route version of the design. One example method generally includes determining one or more output features using a machine learning model based on a pre-route version of a design of an integrated circuit, where the one or more output features include a density map providing an estimate of a density of elements associated with a routed version of the design. The method also includes estimating parasitic information associated with the design based on the one or more output features, and outputting the parasitic information.

18 Claims, 12 Drawing Sheets

- Input features (per gcell, per layer)
  - Cell Map Density (0.29)
  - Routing Blockage Density (0.1)
  - Net Pin Tuples
    - Net type 1 - (Layer, num_drv_pins, num_sink_pins)
      - (1, 10, 12) - M1, Drv Pins (M1 - 10), Sink Pins (M1 - 12)
      - (2, 15, 17) - M2, Drv Pins (M2 - 15), Sink Pins (M2 - 17)
      - (3, 1, 3) - M3, Drv Pins (M3 - 1), Sink Pins (M3 - 3)
      - (4, 0, 3) - M4, Drv Pins (M4 - 0), Sink Pins (M4 - 3)
      - (5, 3, 0) - M5, Drv Pins (M5 - 3), Sink Pins (M5 - 0)
      - .....
    - Net type 2 - (Layer, num_drv_pins, num_sink_pins)
    - Net type 3 - (Layer, num_drv_pins, num_sink_pins)
- Output features (per gcell, per layer)
  - Density 0.78

FIG. 8A

MACHINE LEARNING BASED PARASITIC ESTIMATION FOR AN INTEGRATED CIRCUIT CHIP DESIGN

CROSS-REFERENCE TO RELATED APPLICATION

The present disclosure claims priority to U.S. Provisional Application No. 63/063,101 filed Aug. 7, 2020, which is hereby expressly incorporated by reference herein in its entirety as if fully set forth below and for all applicable purposes.

TECHNICAL FIELD

The present disclosure generally relates to an electronic design automation system. In particular, the present disclosure relates to a system and method for providing machine learning based determination of parasitic resistance and capacitance values for an integrated circuit chip design.

BACKGROUND

During an integrated (IC) chip design process, differences may exist between pre-route and post-route designs. For example, the resistance and capacitance (RC) estimation of the pre-route designs of an IC chip design may differ from the RC estimation of the post-route design. The difference in the RC estimations results in a timing miscorrelation (e.g., estimated signal propagation timing) between the pre-route designs and the post-route designs. In a pre-routed design, the resistance between layers is difficult to predict, leading to differences in the RC estimation between pre-route and post-route designs.

SUMMARY

The present disclosure relates to determining parasitic resistance and capacitance values for an integrated circuit chip design.

Some aspects are directed to a method for parasitic analysis. The method generally includes determining, by one or more processors, one or more output features using a machine learning model based on a pre-route version of a design of an integrated circuit, wherein the one or more output feature include a density map providing an estimate of a density of elements associated with a routed version of the design; estimating parasitic information associated with the design based on the one or more output features; and outputting the parasitic information.

Some aspects are directed to a method for parasitic analysis. The method generally includes determining, by one or more processors, one or more output features using a machine learning model based on a pre-route version of a design of an integrated circuit; generating a density map providing a density of elements associated with the design, wherein the density map is generated based on a routed version of the design; estimating parasitic information associated with the design based on the one or more output features and the density map; and outputting the parasitic information.

Some aspects are directed to another method for parasitic analysis. The method generally includes generating a machine learning model by performing training of the machine learning model based on a training set of integrated circuit designs, wherein the machine learning model is trained to determine one or more output features for estimation of parasitic information associated with an integrated circuit design to be analyzed, the one or more output features including a density map providing an estimate of a density of elements associated with a routed version of the integrated circuit design to be analyzed; and providing the machine learning model for the estimation of the parasitic information.

Other aspects provide: an apparatus operable, configured, or otherwise adapted to perform the aforementioned methods as well as those described elsewhere herein; a non-transitory, computer-readable media having instructions that, when executed by one or more processors of an apparatus, cause the apparatus to perform the aforementioned methods as well as those described elsewhere herein; and a computer program product embodied on a computer-readable storage medium including code for performing the aforementioned methods as well as those described elsewhere herein. By way of example, an apparatus may include a processing system, a device with a processing system, or processing systems cooperating over one or more networks.

The following description and the appended figures set forth certain features for purposes of illustration.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 8A illustrates example input features and output features used to generate a density value, in accordance with certain aspects of the present disclosure.

DETAILED DESCRIPTION

Aspects of the present disclosure relate to machine learning-based parasitic estimation for an integrated circuit chip design. Certain aspects use machine learning (ML) to improve an integrated circuit (IC) chip design process. An ML engine is trained in an IC chip design process using a router on one or more IC chip designs or based on a training set including predetermined routed designs. The ML engine is applied to a pre-route IC chip design to infer layer usage and vias to provide a more accurate pre-route and post-route correlation, and thus improving the quality of result (QoR) of a final routed design.

Parasitic resistance and capacitance (RC) information may depend on various factors including routing shapes. However, current IC design processes do not account for resistance between layers when estimating the parasitic RC based on a pre-route design. In some implementations, routing density and routing spacing is used to determine the parasitic RC of an IC chip design. Further, RC information associated with a unit area of a metal on each layer as well as RC technology tables are used to generate the parasitic RC information of an IC chip design. An RC technology table is a lookup table that includes the effects of width, space, density, and temperature on RC coefficients supported by an IC fabrication process, with dimensions and process-related dimension variations for each feature. For example, the RC technology table includes an entry for a feature including a certain size and shape of transistor.

Figure 1:
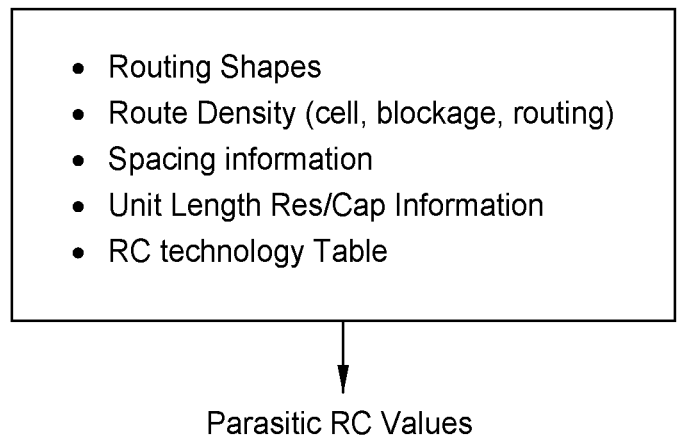
FIG. 1 illustrates example features used to determine parasitic resistance and capacitance values in accordance with certain aspects of the present disclosure.

FIG. 1 illustrates factors that may be used to determine parasitic RC information. As shown, these factors include routing shapes, route density (e.g., associated with a cell, blockage, and routing), spacing information, RC information of a unit area of a layer, as well RC information obtained from a technology table.

Once routing has been completed in a routed design, a density map is generated from routing shapes. Spacing information is obtained from the routing shapes. Routing shapes, density map, and spacing information are used to obtain corresponding information from the technology table. The information within the technology table is used to determine parasitic RC information.

A RC estimate in a pre-route design model may be determined based on routing shapes, routing density, layer information, and/or topology information. For example, parasitic estimation in a pre-route design may depend on a virtual router and a density map composed of a cell map and routing blockage without layers, and probability based spacing. Layer usage is determined using an empirical fixed rate, the rate indicates density per layer that is applied to all global cells (gcells) within that layer and/or a density per layer that is applied to all designs globally. In such implementations, it is difficult to obtain accurate estimation, especially for advanced technology nodes.

In some cases, net features such as length, direction, fan-out, and pin layer information, among others, may be modeled. Accordingly, machine learning technologies implemented using a clustering algorithm is used to predict layer usage with those input features and may be used to model the parasitic RC information between the IC chip design layers.

Figure 2:
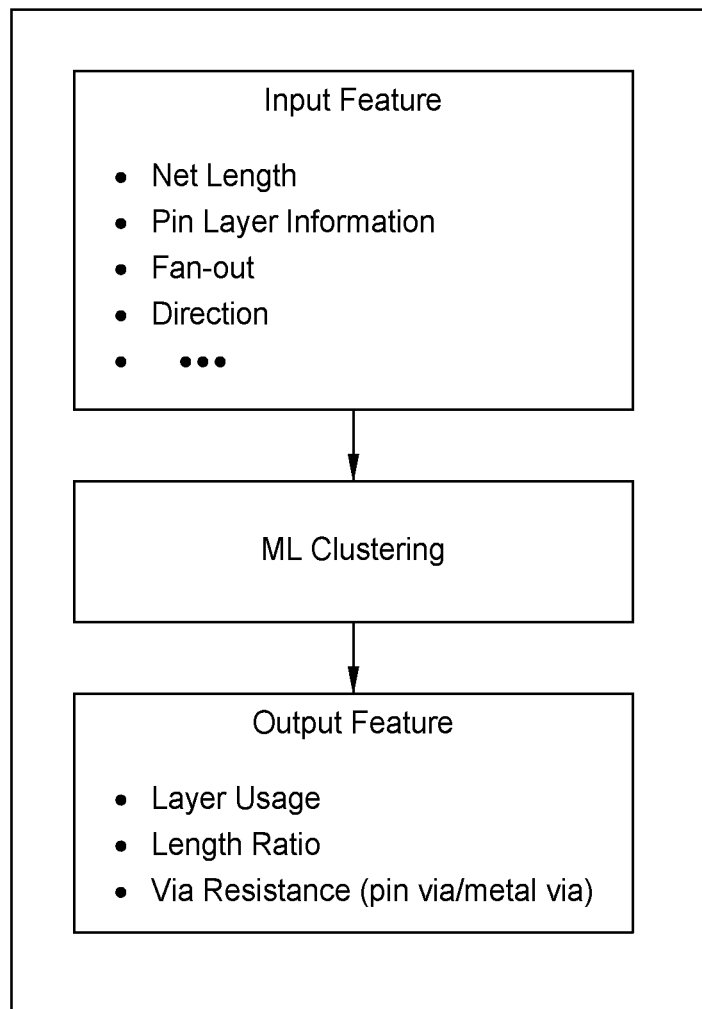
FIG. 2 illustrates example operations for determining output features from input features using machine learning in accordance with some aspects of the present disclosure.

FIG. 2 illustrates input and output features of a machine learning model in accordance with certain aspects of the present disclosure. As shown, the machine learning model may receive various input features, such as net length, pin layer information, fan-out, and direction, among others, based on which various output features may be generated. Clustering analysis is performed on the input feature(s) by the machine learning model to determine the output features. The output features may include layer usage, length ratio, and via resistance (e.g., separately for pin vias and metal vias).

In physical designs, via layers reside between metal layers connecting metal layers. Via layer RC information have similar trends as metal layers and have a gap between layers analogously. Vias impacts the net parasitic RC information. Accordingly, cluster analysis is also used to model the RC information of via layers.

While training a machine learning model, metal vias and pin vias are separated based on location and they are categorized by analyzing via clustering of a layer to determine the layer usage of the metal and pin vias. Furthermore, the machine learning model is trained to generate a length ratio by analyzing the IC design with clustering. The length ratio can be predicted based on one or more input features, as described. In some aspects, the length ratio is determined from a net length, pin layer information, fan-out, and routing direction, among others.

Routing density is used to calculate RC information from parasitic technology tables and/or obtain probabilistic spacing information. Routing density may be design specific. Accordingly, to model the routing density, a router is executed on a pre-route design, in some implementations.

Figure 3:
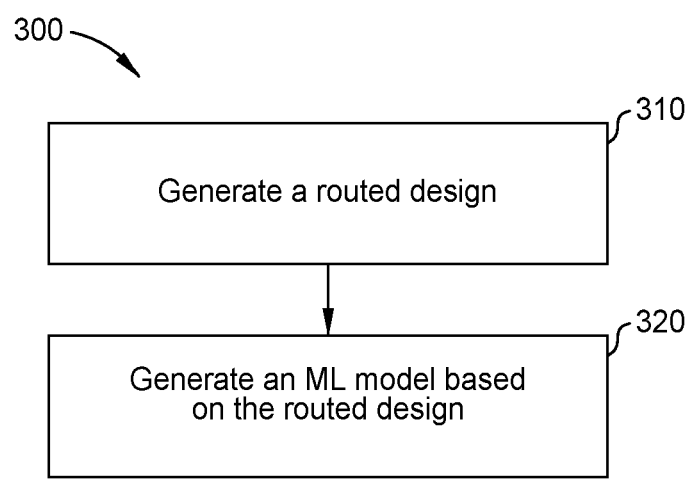
FIG. 3 illustrates example operations for generating a machine learning model in accordance with some aspects of the present disclosure.

FIG. 3 illustrates example operations 300 for generating a machine learning model in accordance with certain aspects of the present disclosure. As shown, at 310, a router is executed on a pre-route IC chip design to generate a routed design (e.g., using global routing). At 320, a cluster analysis is performed on the routed design to generate a machine learning model using a clustering algorithm.

Figure 4:
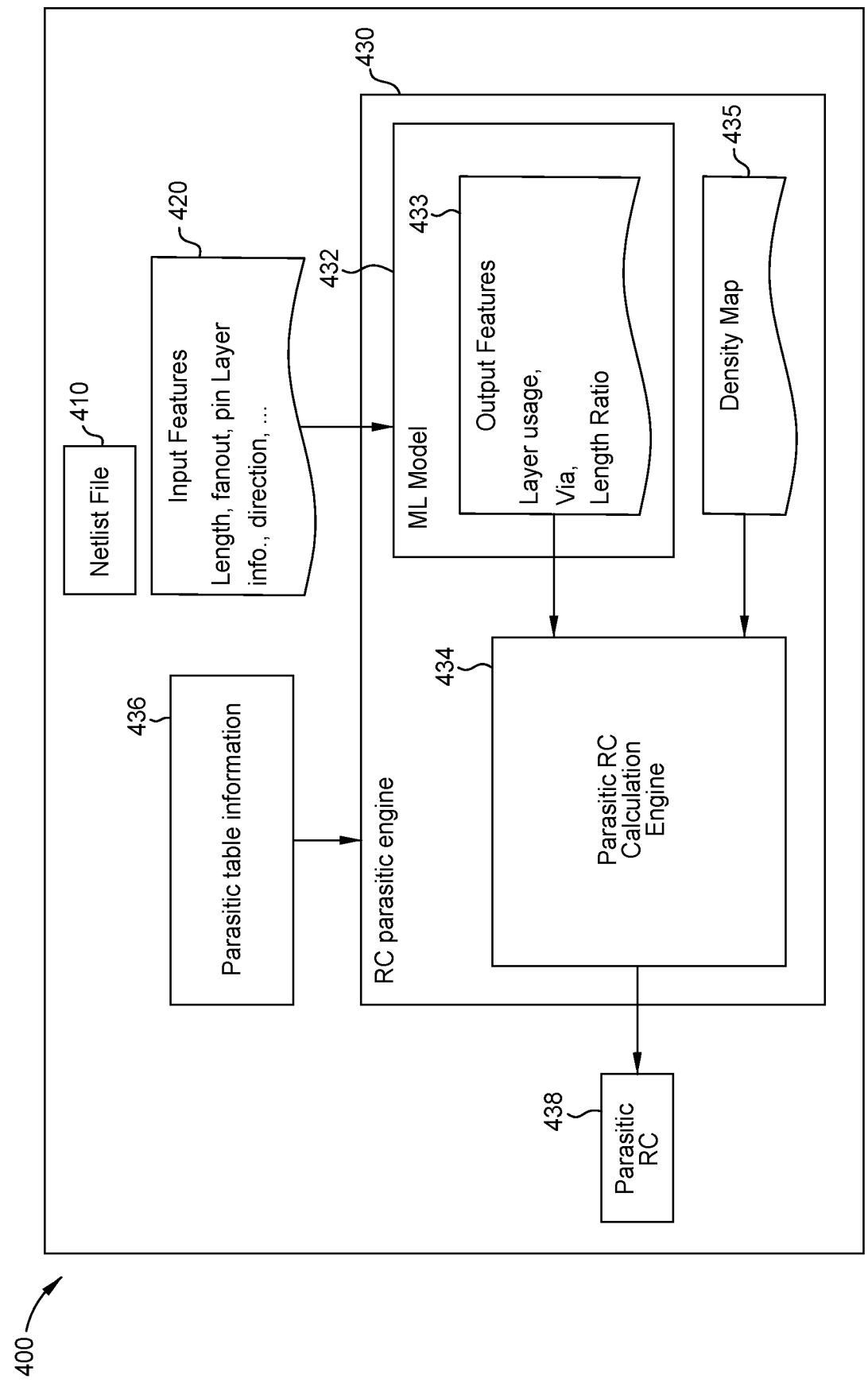
FIG. 4 is a block diagram illustrating example operations for determining parasitic information for a chip design in accordance with some aspects of the present disclosure.

FIG. 4 is a block diagram illustrating example operations 400 for determining parasitic RC values for a chip design. The operations 400 may be performed by a processing device, also referred to as a parasitic RC determination system. As shown, the processing device receives a netlist file 410 of an IC chip design. Input features 420 are identified, by the processing device, from the netlist file 410. A parasitic RC engine 430 of the processing device uses an ML model 432 to generate output features and provide the output features to a parasitic RC calculation engine 434. The ML model 432 is trained based on cluster analysis as described with respect to FIG. 3. The ML model 432 is applied to the input features 420 to generate the output features 433, and the parasitic RC calculation engine 434 processes the output features 433 and a density map 435 using the parasitic information table 436 (also referred to as an RC technology table) to determine parasitic RC information 438 for the IC chip design. The density map 435 is a value representing the amount of devices and routing shapes (e.g., elements) occupying each global cell of each layer of an IC chip design. The parasitic information table 436 includes unit resistance and capacitance information per layer of the design based on the corresponding process technology (e.g., 7 nm process technology or 12 nm process technology, among others). The parasitic information table 436 is used to determine the parasitic RC information for the output features such as the length ratio of the routings, the layer usage, and via resistance for the corresponding process technology.

The parasitic RC engine 430 includes instructions stored within a memory (e.g., the memory 1304 of FIG. 13) that when executed by one or more processors (e.g., the processing device 1302 of the FIG. 13) cause the one or more processors to process the input features 420 using the machine learning model 432 to generate the output features 433, and/or determine the parasitic RC information 438 based on the output features 433, the density map 435, and the parasitic information table 436.

Figure 5:
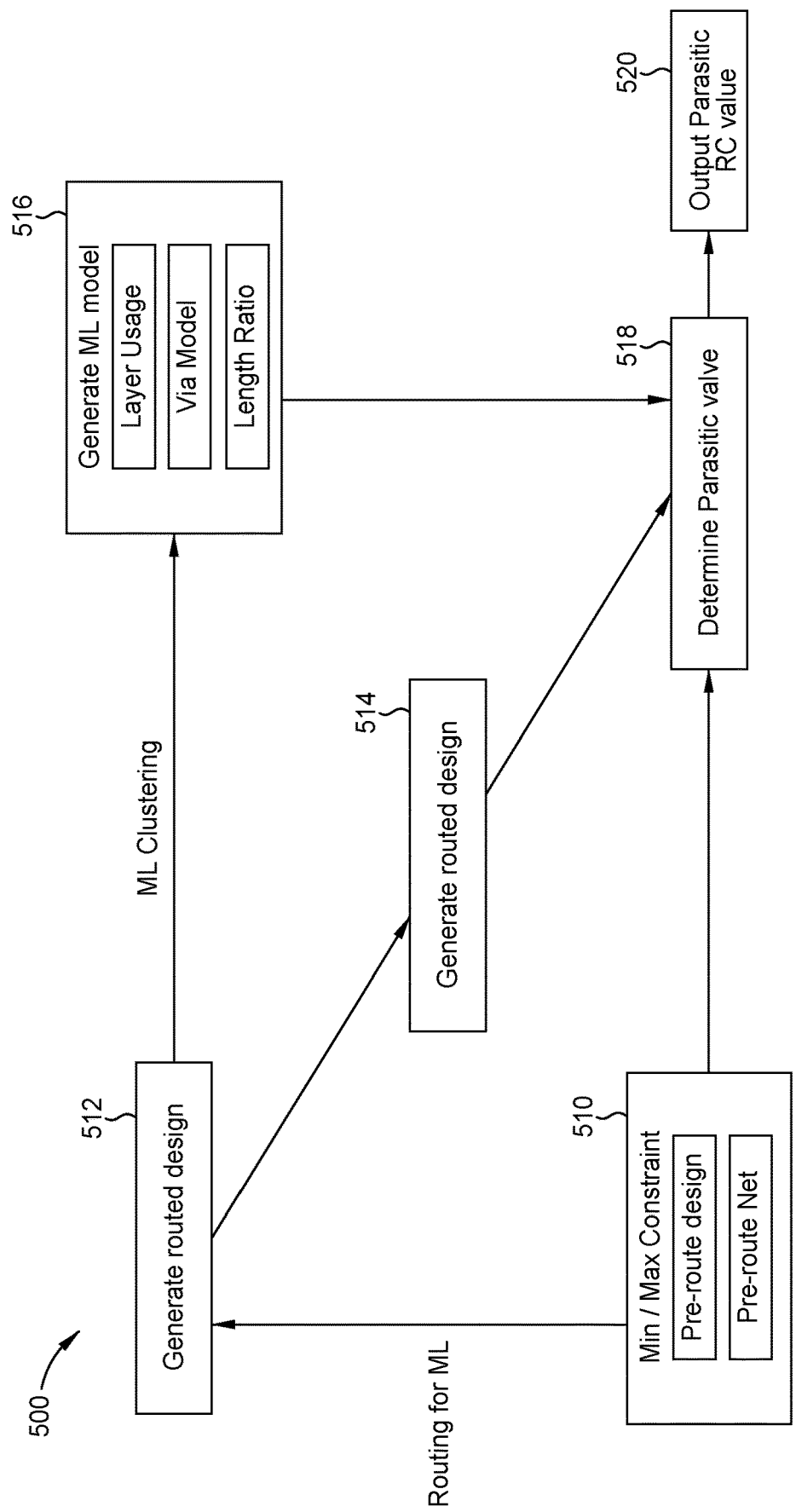
FIG. 5 illustrates example operations for determining parasitic information according to certain aspects of the present disclosure.

FIG. 5 illustrates example operations 500 for determining parasitic RC information based on output features generated by a machine learning model and a density map according to certain aspects of the present disclosure. At 510, a processing device receives a pre-route design having pre-route net information and maximum and minimum constraint information. The maximum and minimum constraint information refers to layer constraints for the nets. At 512, the processor generates a routed design by routing the pre-route design. At 514, a density map (e.g., the density map 435) of the IC chip design is generated based on the routing density of the routed design generated at 512. At 516, a ML model (e.g., the ML model 432) is generated by cluster analyzing the routed design. At 518, parasitic RC information (e.g., the parasitic RC information 438) is determined through the density map and the output of the ML model (e.g., output features 433). For example, as described with respect to FIG. 4, parasitic information table 436 (e.g., a look-up table) may be used to determine the RC value associated with (e.g., mapped to) a specific density and output feature(s). The parasitic RC information 438 is generated by combining each layer's unit RC value and/or feature of the IC chip design. In some aspects, an RC value is determined for each routing shape within the IC chip design based on each corresponding layer, via, and/or length of each routing shape. The RC value is generated using the density map that is generated using a routed design (e.g., at 512), as well as the output, features generated using the ML model 516 which operates on the pre-route version of the design (e.g., received at 510). At 520, the processing device outputs (e.g., to a user) the parasitic RC information. For example, parasitic RC information may be provided to a user to update the IC chip design for more chip design optimization. The operations 500 may be implemented as part of design planning 1222, as later described below with respect to FIG. 12.

Figure 6:
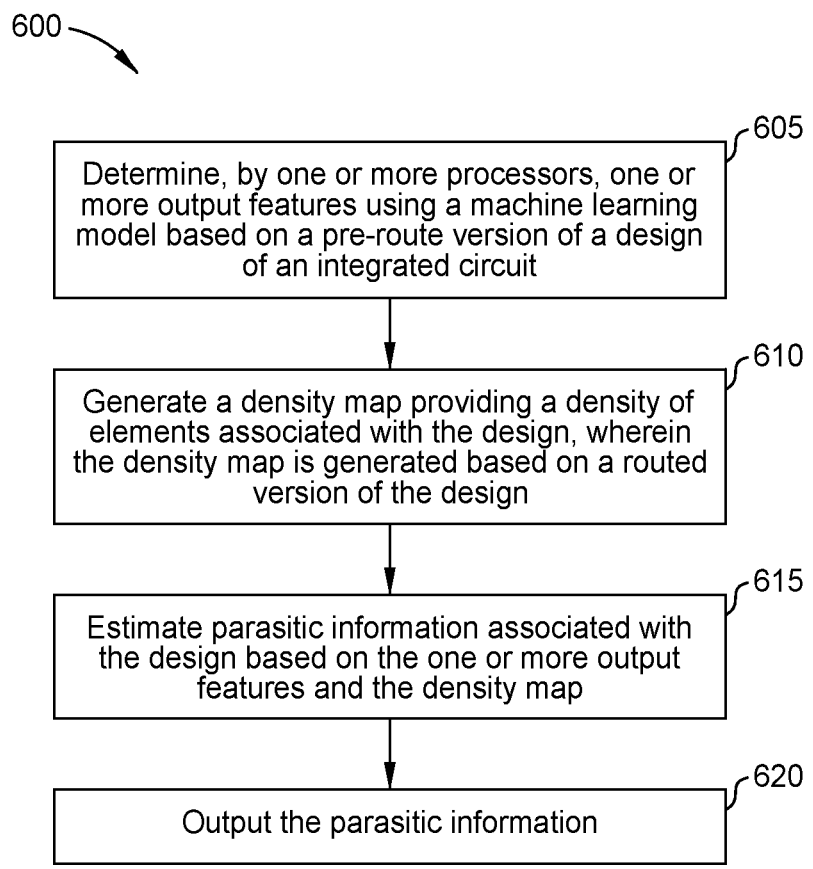
FIG. 6 is a flow diagram illustrating example operations for parasitic analysis in accordance with certain aspects of the present disclosure.

FIG. 6 is a flow diagram illustrating example operations 600 for parasitic analysis, in accordance with certain aspects of the present disclosure. The operations 600 may be performed by a processing device, such as the processing device 1302 of FIG. 13 among others.

The operations 600 begins, at 605, the processing device determining one or more output features (e.g., information associated with vias and layers of the design) using a machine learning model based on a pre-route version of a design (e.g., a netlist representing the design) of an integrated circuit. At 610, the processing device generates a density map (e.g., as described with respect to FIG. 5 at 514) providing a density of elements associated with the design. The density map may be generated based on a routed version of the design (e.g., where the routed version of the design is generated at 512, as described). At 615, the processing device estimates parasitic information (e.g., at least one a parasitic capacitance or a parasitic resistance) associated with the design based on the one or more output features and the density map, and at 620, outputs the parasitic information (e.g., as described with respect to FIG. 5 at 520).

In some aspects, the density map includes a density value generated for each of multiple cells of the design and each of multiple layers associated with the design. The density map may be generated based on a quantity of pins associated with each the multiple layers and each of the multiple cells representing components of the design. In some aspects, estimating the parasitic information associated with the design is based on a technology table indicating a mapping between potential output features and parasitic information for a technology associated with the design.

Processing an IC design chip may include multiple instances of a router being implemented in a pre-route design flow. For example, a router may be used to generate a congestion map and/or to guide placement. As executing routing is processing time-intensive, an alternative to running a router for each part of the process flow may include reusing routed traits from other similar components to generate the congestion map and/or to guide placement. Similarly, using a router to generate the ML model 432 is processing time-intensive within a design flow. However, once an ML model has been generated, the ML model may be used to determine the output features for determining RC parasitic information for multiple IC designs.

In some aspects, a supervised ML model may be used to determine the density map. A supervised ML model uses a training process for generating a ML model based on a training set of routed designs. Once the ML model is established, the corresponding runtime penalty for ML in the design flow is reduced. A density map may change during a design flow due to placement change of one or more design elements. By training a machine learning model to predict the density map, the density map may be generated without running a router on the pre-route design, allowing a reduction in runtime during IC design. In some aspects, the ML model may generate the density map based on pin information for each global cell (gcell) and layer of a design, as described in more detail with respect to FIG. 7.

Figure 7:
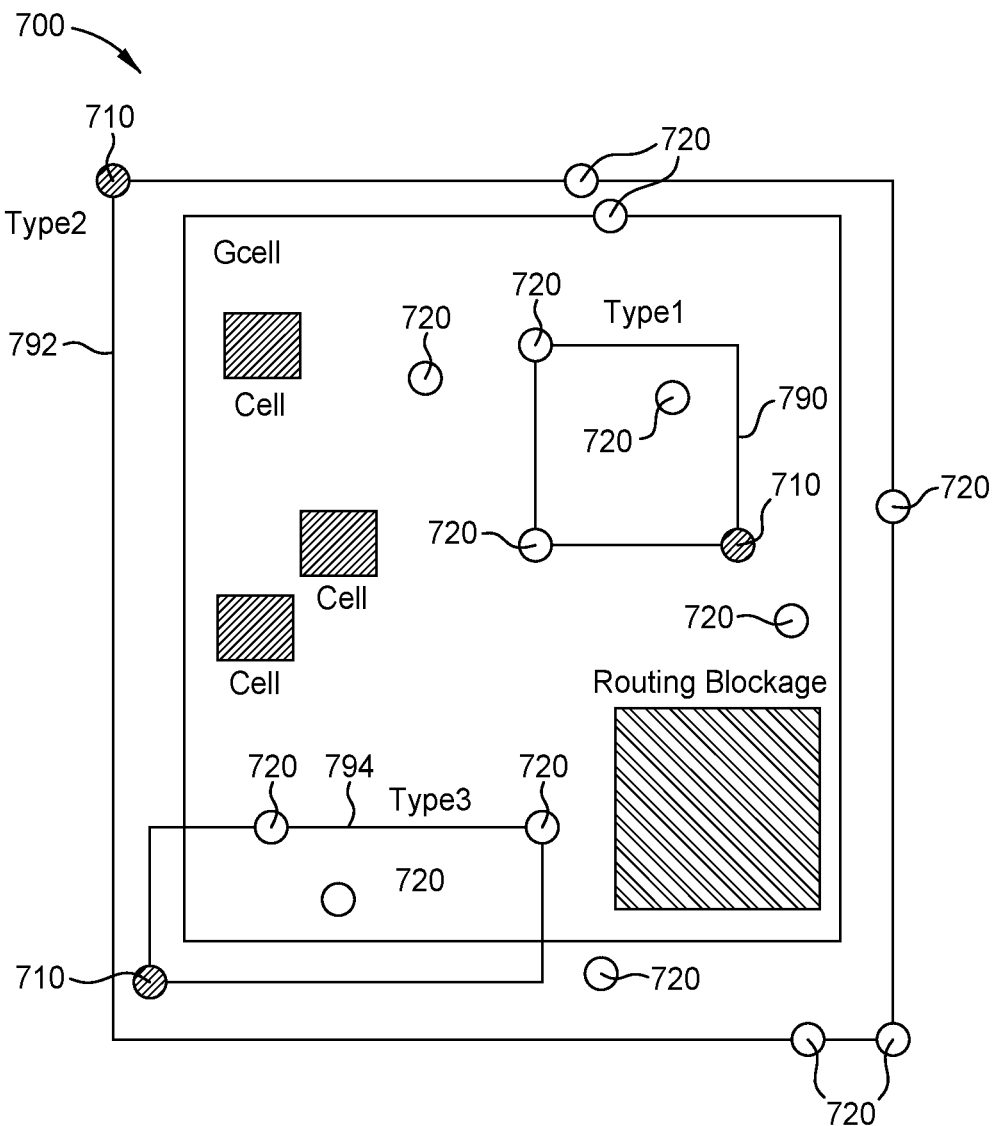
FIG. 7 illustrates an example global cell in accordance with some aspects of the present disclosure.

FIG. 7 illustrates an IC chip design including a gcell 700. The gcell 700 may be used for generating a routing plan. For example, during global routing, a router partitions a design into rectangles called gcells and assigns signal nets on the gcells. The global router attempts to find the shortest or least time consuming path through the gcells or assign nets to specific tracks within the gcells, while avoiding assigning more nets to a gcell than the tracks of the gcell can accommodate. A detailed router then uses the global routing paths as a routing plan.

In some aspects, training of an ML model for generating a density map may be performed per global cell and per layer. For example, an IC chip design may be divided into gcells, such as gcell 700 shown in FIG. 7. The density map is generated by considering cell instances, routing blockages and/or routing shapes on each layer and for each gcell.

A router makes connections between pins considering the environment associated with a gcell. That is, environmental information for a gcell may be gathered, such as location(s) of driver pins and sink pins and characteristics of cell map and routing blockage in the gcell. Net pin layer information, cell instance and routing blockage may also be used as input features, such that the density of a gcell for each layer is predicted.

In some cases, net bounding boxes may be used in the IC design. A net bounding box provides a boundary for routing a specific net. In other words, routing for a specific net may be constrained to be within the bounding box for the net.

The net associated with a gcell may be categorized into type1, type2 and type3 based on the associated net bounding box. In type1, the net bounding box is enclosed by a corresponding gcell. Net boundary box 790 is one example of a type 1 net bounding box since the net boundary box 790 is enclosed by gcell 700. In type2, the net bounding box encloses a corresponding gcell. Net boundary box 792 is an example of a type 2 net bounding box since net boundary box 792 encloses the gcell 700. In type3, a net bounding box is overlapped by a corresponding gcell. Net boundary box 794 is an example of a type 3 net bounding box since net boundary box 794 is overlapped with the gcell 700.

FIG. 8A illustrates example input features and output features used to generate a density value for each gcell and each layer to form a density map. As shown, net type (e.g., type 1, type 2, and type 3 described with respect to FIG. 7), pin layer information are provided as tuples per layer when using the machine learning model to generate the density map. The tuples include layer information, a number of driver pins (e.g., driver pins 710 shown in FIG. 7), and a number of sink pins (e.g., sink pins 720 shown in FIG. 7), for each type of net bounding box and for each gcell and each layer. Cell map density and routing blockage density in the gcell, are input features for machine learning to predict gcell density and generate a density map with the net pin tuples.

Figure 8B:
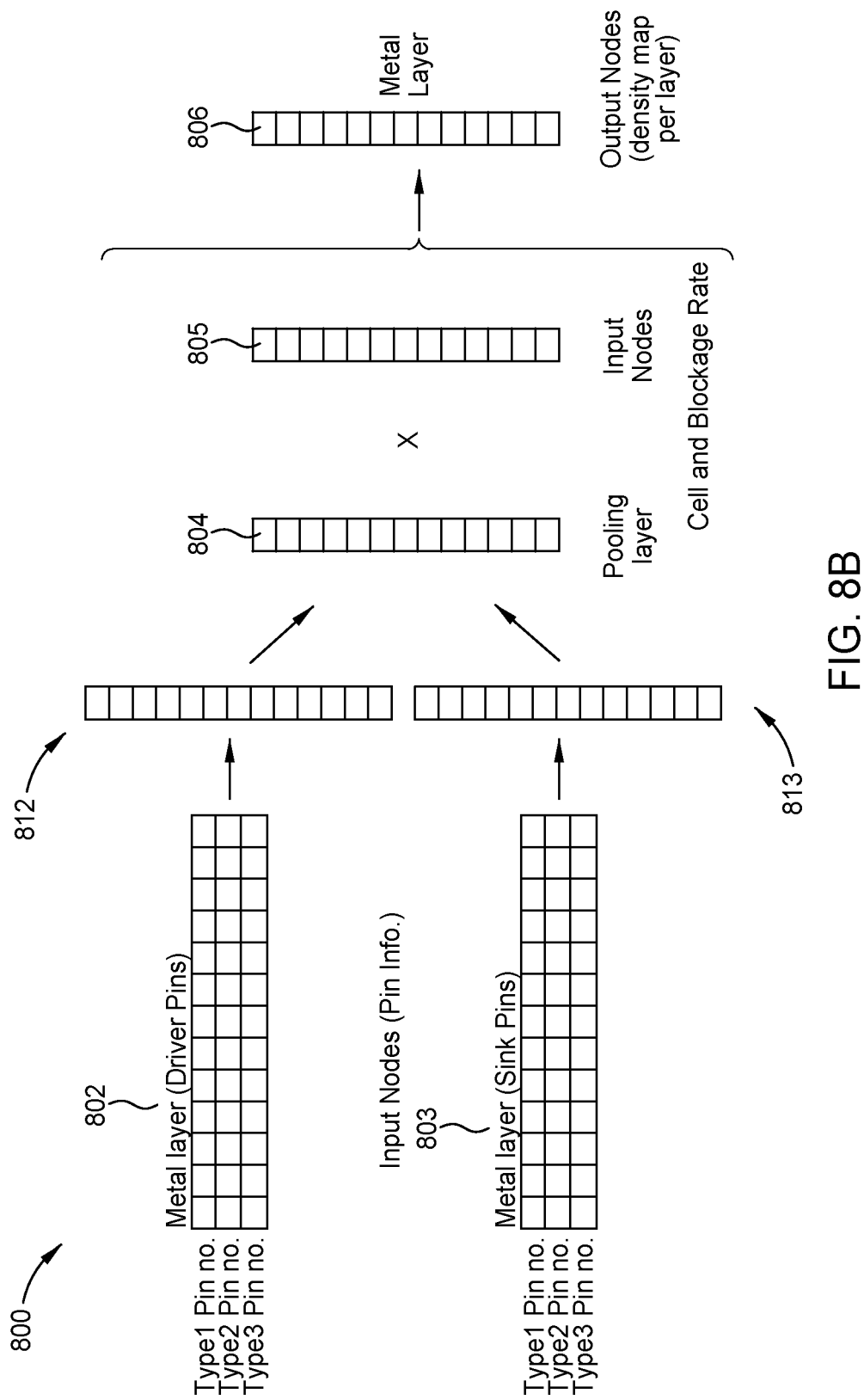
FIG. 8B illustrates an example machine learning technique for generating a density map in accordance with some aspects of the present disclosure.

FIG. 8B illustrates an example of a convolutional neural network (CNN) 800 that is used to generate a density map. The input nodes to the CNN 800 include a layer 802 indicating a number of driver pins of a layer of an IC chip design and a layer 803 indicating a number of sink pins of a layer of the IC chip design. As shown, the layer 802 is flattened to obtain the flattened layer 812 and the layer 803 is flattened to obtain the flattened layer 813. The flattened layer 812 and the flattened layer 813 are combined, and the dimension of the combined layers 812, 813 is reduced using pooling (e.g., average pooling or max pooling) to obtain the pooling layer 804. A pooling layer reduces the spatial size of the representation to reduce the amount of parameters and computation in the network. For example, a pooling window is traversed over regions of the layers 812, 813, where a single output (e.g., an average for an average pooling technique) is calculated for each location traversed by the pooling window. The single output is an average of inputs in the pooling window when using an average pooling technique or a maximum of the inputs in the pooling window when using a max pooling technique.

The output of the pooling layer 804 is combined with input nodes 805 to generate the output nodes 806. The input nodes 805 include cell and blockage rate information for the particular layer input to the CNN 800. The output nodes 806 correspond to a density map for a gcell. The CNN 800 is performed for each layer of the IC design to generate a density map for each layer.

While FIG. 8B illustrates a CNN for generating a density map, the aspects of the present disclosure may be implemented with any suitable neural network such as a recurrent neural network (RNN) or other deep neural networks. In one aspect, the layers of a design file are analyzed to determine a plurality of logits which are represented by the density map. For example, 255 logits may be generated from a design file by analyzing the layers of the design file.

Figure 9:
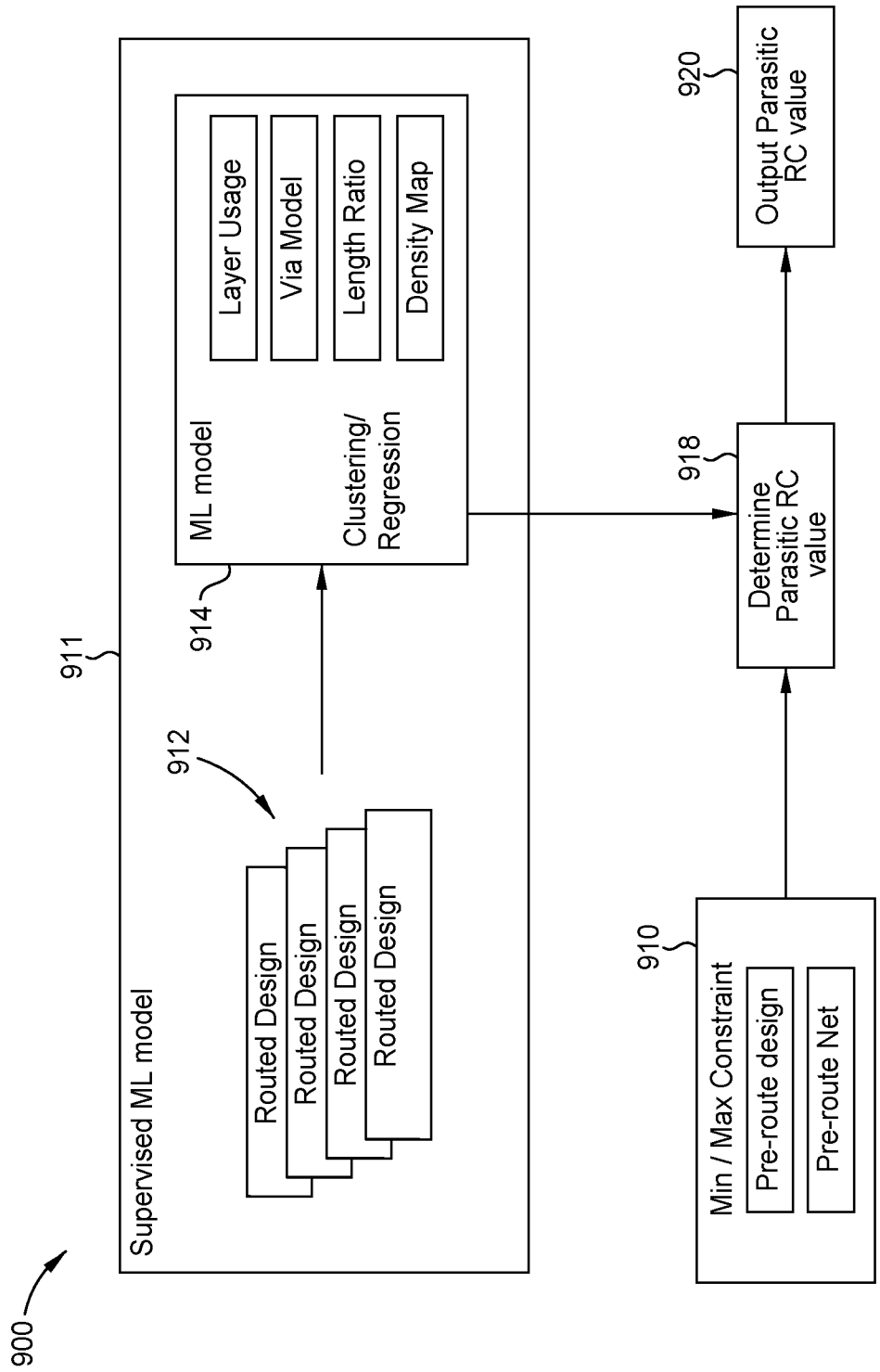
FIG. 9 illustrates example operations for generating parasitic information according to certain aspects of the present disclosure.

FIG. 9 illustrates example operations 900 for estimating parasitic RC information using a supervised machine learning model, according to certain aspects of the present disclosure. Operations 900 include, at 911, generating an ML model 914 based on a training set 912 including routed designs. The ML model 914 may be trained to generate a density map, as well as other output features (e.g., layer usage, via model, and length ratio) as described herein. The ML model 914 may be trained to generate output features such as layer usage, via model, and length ratio using a technique similar to that described with respect to FIG. 8B. The routed designs are design patterns for various design groups and/or design process technologies. The design groups correspond to design entities (e.g., a company or other design-capable entity). For example, each design entity may have a different design style or styles. The machine learning mode may be trained based on the different style or style of each entity. As an example, a user may provide a specific technology used for IC chip design, such as a 7 nm process technology. The routed designs used to train the machine learning model may be associated with the technology of the user such that the machine learning model is trained specifically for the user specifications.

At 910, a processing device receives a pre-route design having pre-route net information and maximum and minimum constraint information. As described herein, the maximum and minimum constraint information refers to layer constraints for the nets.

At 918, the processing device generates parasitic RC information by applying the ML model 914 to the pre-route design. The ML model 914 may be used to generate output features, including a density map to generate the parasitic RC information. As shown, the output features include layer usage, via information, and routing length ratio. At 920, the parasitic RC value is output to a user for consideration during IC chip design. The operations 900 may be implemented as part of design planning 1222 of FIG. 12.

Figures 10, 11:
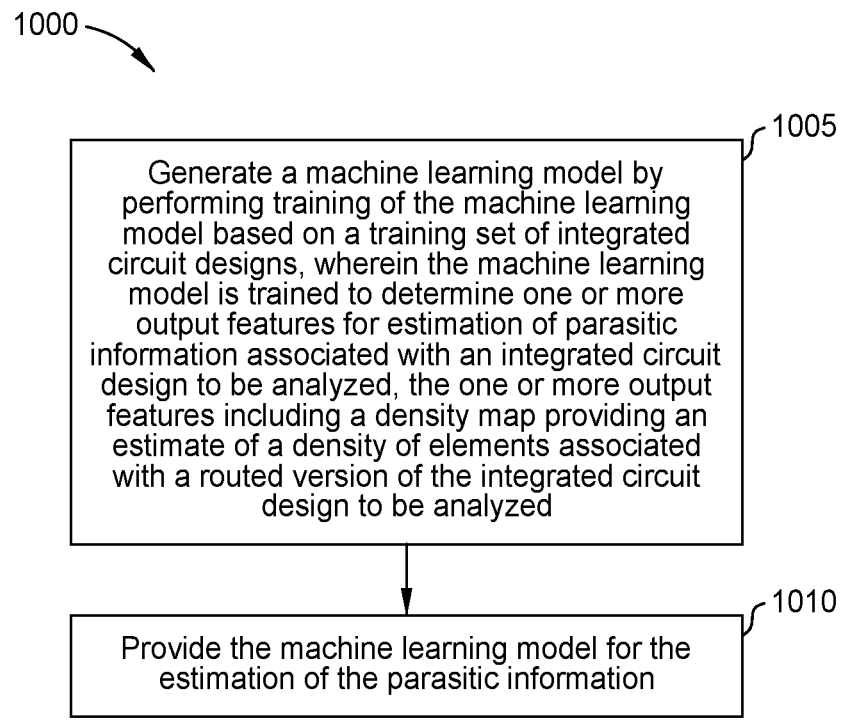
FIG. 10 is a flow diagram illustrating example operations for parasitic analysis in accordance with certain aspects of the present disclosure.
FIG. 11 is a flow diagram illustrating example operations for parasitic analysis in accordance with certain aspects of the present disclosure.

FIG. 10 is a flow diagram illustrating example operations 1000 for parasitic analysis, in accordance with certain aspects of the present disclosure. The operations 1000 may be performed by a processing device, such as the processing device 1302 of FIG. 13 among others.

The operations 1000 begin, at 1005, with the processing device generating a machine learning model by performing training of the machine learning model based on a training set (e.g., training set 912) of integrated circuit designs. In some aspects, the machine learning model is trained to determine one or more output features for estimation of parasitic information associated with an integrated circuit design to be analyzed. The one or more output features may include a density map providing an estimate of a density of elements associated with a routed version of the integrated circuit design to be analyzed. At 1010, the processing device provides the machine learning model for the estimation of the parasitic information. For example, the machine learning model may be trained by one entity, and provided to another entity for performing analysis of IC designs.

In some aspects, generating the machine learning model includes training the machine learning model to generate the density map by applying a clustering algorithm to the training set. The machine learning model may generate the density map for each of multiple global cells and each of multiple layers associated with the integrated circuit design to be analyzed. The machine learning model generates the density map based on a quantity of pins associated with each the multiple layers and each of the multiple global cells.

FIG. 11 is a flow diagram illustrating example operations 1100 for parasitic analysis, in accordance with certain aspects of the present disclosure. The operations 1100 may be performed by a processing device, such as the processing device 1302 of FIG. 13 among others.

The operations 1100 begin, at 1105, with the processing device determining one or more output features (e.g., information associated with vias and layers of the design) using a machine learning model based on a pre-route version of a design (e.g., a netlist representing the design) of an integrated circuit. In some aspects, the one or more output feature include a density map (e.g., as shown in FIG. 9) providing an estimate of a density of elements associated with a routed version of the design. At 1110, the processing device estimates parasitic information (e.g., as described with respect to FIG. 9 at 918) associated with the design based on the one or more output features, and at 1115, outputs the parasitic information (e.g., as described with respect to FIG. 9 at 920).

In some aspects, the parasitic information includes at least one of a parasitic capacitance or a parasitic resistance associated with the design. In some cases, the density map includes a density value generated for each of multiple global cells (e.g., gcell 700) of the design and each of multiple layers (e.g., layers M1 to M5 shown in FIG. 8A) associated with the design. The density map may be generated based on a quantity of pins (e.g., a quantity of drive pins and a quantity of sink pins) associated with each of the multiple layers and each of the multiple global cells. In some aspects, the design includes different types of net boundary boxes (e.g., type 1, type 2, and type 3, as will be described with respect to FIG. 7). In this case, the density map is generated based on the quantity of pins associated with each of the types of net boundary boxes. The types of net boundary boxes include a first type of net boundary box (e.g., net boundary box 790) that is enclosed by a global cell of the design, a second type of net boundary box (e.g., net boundary box 792) that encloses the global cell, and a third type of net boundary box (e.g., net boundary box 794) that is overlapped by the global cell. In certain aspects, estimating the parasitic information associated with the design is based on a technology table (e.g., parasitic information table 436) indicating a mapping between potential output features and parasitic information for a technology associated with the design.

Figure 12:
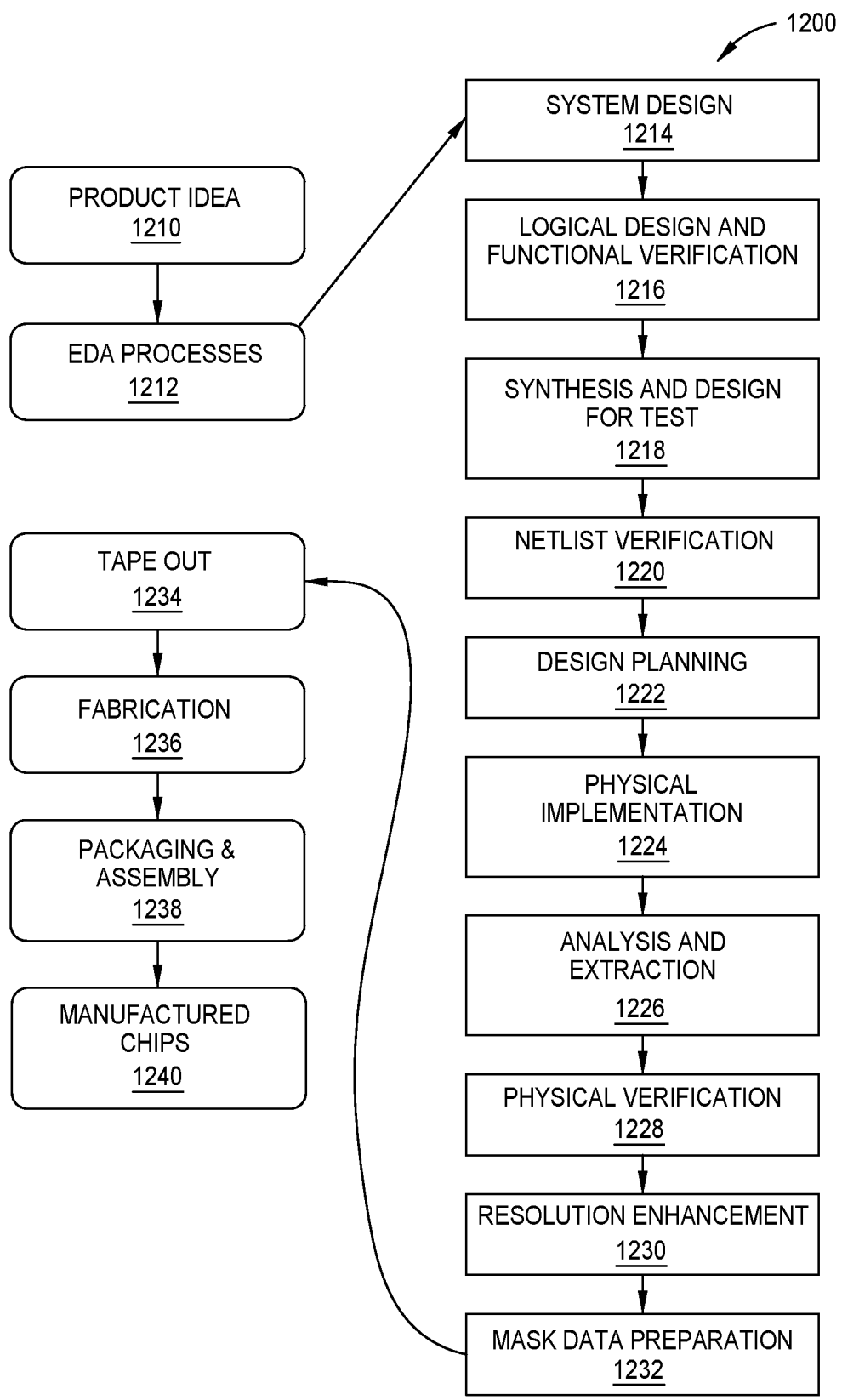
FIG. 12 depicts a flowchart of various processes used during the design and manufacture of an integrated circuit in accordance with some embodiments of the present disclosure.

FIG. 12 illustrates an example set of processes 1200 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1210 with information supplied by a designer, information which is transformed to create an article of manufacture that uses a set of EDA processes 1212. When the design is finalized, the design is taped-out 1234, which is when artwork (e.g., geometric patterns) for the integrated circuit is sent to a fabrication facility to manufacture the mask set, which is then used to manufacture the integrated circuit. After tape-out, a semiconductor die is fabricated 1236 and packaging and assembly processes 1238 are performed to produce the finished integrated circuit 1240.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 12. The processes described by be enabled by EDA products (or tools).

During system design 1214, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1216, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1218, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1220, the netlist is checked for compliance with timing constraints and for correspondence with the HDL code. During design planning 1222, an overall floor plan for the integrated circuit is constructed and analyzed for timing and top-level routing.

During layout or physical implementation 1224, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1226, the circuit function is verified at the layout level, which permits refinement of the layout design. During physical verification 1228, the layout design is checked to ensure that manufacturing constraints are correct, such as DRC constraints, electrical constraints, lithographic constraints, and that circuitry function matches the HDL design specification. During resolution enhancement 1230, the geometry of the layout is transformed to improve how the circuit design is manufactured.

During tape-out, data is created to be used (after lithographic enhancements are applied if appropriate) for production of lithography masks. During mask data preparation 1232, the 'tape-out' data is used to produce lithography masks that are used to produce finished integrated circuits.

A storage subsystem of a computer system (such as computer system 1300 of FIG. 13) may be used to store the programs and data structures that are used by some or all of the EDA products described herein, and products used for development of cells for the library and for physical and logical design that use the library.

Figure 13:
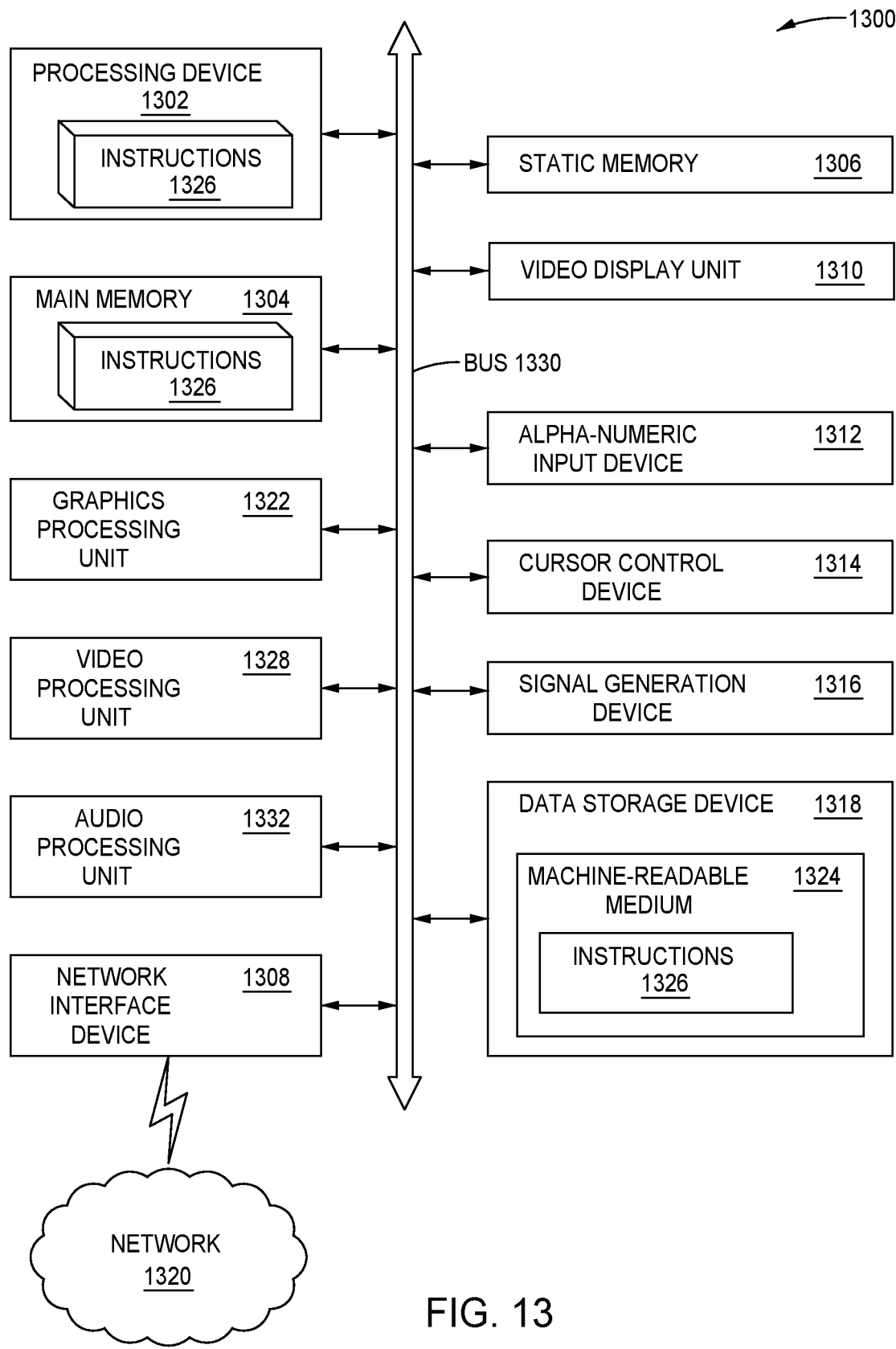
FIG. 13 depicts a diagram of an example computer system in which embodiments of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

Processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for parasitic analysis, comprising:
   determining, by one or more processors, one or more output features using a machine learning model based on a pre-route version of a design of an integrated circuit, wherein the one or more output features include a density map providing an estimate of a density of elements associated with a routed version of the design, wherein the density map includes a density value generated for each of multiple cells of the design and each of multiple layers associated with the design;
   estimating parasitic information associated with the design based on the one or more output features including the density map; and
   outputting the parasitic information.

2. The method of claim 1, wherein the parasitic information comprises at least one or more of a parasitic capacitance and a parasitic resistance associated with the design.

3. The method of claim 1, wherein the density map is generated based on a quantity of pins associated with each the multiple layers and each of the multiple cells.

4. The method of claim 3, wherein the quantity of pins includes a quantity of drive pins and a quantity of sink pins.

5. The method of claim 3, wherein the design includes different types of net boundary boxes, and wherein the density map is generated based on the quantity of pins associated with each of the types of net boundary boxes.

6. The method of claim 5, wherein the types of net boundary boxes includes a first type of net boundary box that is enclosed by a cell of the design, a second type of net boundary box that encloses the cell, and a third type of net boundary box that is overlapped by the cell.

7. The method of claim 1, wherein the one or more output features include information associated with vias and layers of the design.

8. The method of claim 1, wherein estimating the parasitic information associated with the design is based on a technology table indicating a mapping between potential output features and parasitic information for a technology associated with the design.

9. A method for parasitic analysis, comprising:
   determining, by one or more processors, one or more output features using a machine learning model based on a pre-route version of a design of an integrated circuit;
   generating a density map providing a density of elements associated with the design, wherein the density map is generated based on a routed version of the design;
   estimating parasitic information associated with the design based on the one or more output features and the density map; and
   outputting the parasitic information.

10. The method of claim 9, wherein the parasitic information comprises at least one or more of a parasitic capacitance and a parasitic resistance.

11. The method of claim 9, wherein the density map includes a density value generated for each of multiple cells of the design and each of multiple layers associated with the design.

12. The method of claim 11, wherein the density map is generated based on a quantity of pins associated with each of the multiple layers and each of the multiple cells representing components of the design.

13. The method of claim 9, wherein the one or more output features include information associated with vias and layers of the design.

14. The method of claim 9, wherein estimating the parasitic information associated with the design is based on a technology table indicating a mapping between potential output features and parasitic information for a technology associated with the design.

15. A method for parasitic analysis, comprising:
   generating a machine learning model by performing training of the machine learning model based on a training set of integrated circuit designs, wherein the machine learning model is trained to determine one or more output features for estimation of parasitic information associated with an integrated circuit design to be analyzed, the one or more output features including a density map providing an estimate of a density of elements associated with a routed version of the integrated circuit design to be analyzed, wherein the machine learning model generates the density map for each of multiple cells and each of multiple layers associated with the integrated circuit design to be analyzed; and
   providing the machine learning model for the estimation of the parasitic information.

16. The method of claim 15, wherein generating the machine learning model includes training the machine learning model to generate the density map by applying a clustering algorithm to the training set.

17. The method of claim 10, wherein the machine learning model generates the density map based on a quantity of pins associated with each the multiple layers and each of the multiple cells.

18. The method of claim 15, wherein the one or more output features include information associated with vias and layers of the integrated circuit design to be analyzed.

* * * * *